United States Patent
Chen et al.

(10) Patent No.: US 12,135,233 B2
(45) Date of Patent: Nov. 5, 2024

(54) ACOUSTIC NOISE DETECTION METHOD AND SYSTEM USING VIBRATION SENSOR TO DETECT ACOUSTIC NOISE

(71) Applicant: BENQ CORPORATION, Taipei (TW)

(72) Inventors: Shih-Pin Chen, Taoyuan (TW); Wen-Lun Chien, New Taipei (TW); Chin-Fu Chiang, New Taipei (TW); Chang-Sheng Lee, New Taipei (TW)

(73) Assignee: BenQ Corporation, Taipei (TW)

( * ) Notice: Subject to any disclaimer, the term of this patent is extended or adjusted under 35 U.S.C. 154(b) by 502 days.

(21) Appl. No.: 17/406,058

(22) Filed: Aug. 18, 2021

(65) Prior Publication Data

US 2022/0155137 A1    May 19, 2022

(30) Foreign Application Priority Data

Nov. 19, 2020   (CN) .......................... 202011300024.0

(51) Int. Cl.
*G01H 3/08*   (2006.01)
*G01H 17/00*  (2006.01)

(52) U.S. Cl.
CPC ............... *G01H 3/08* (2013.01); *G01H 17/00* (2013.01)

(58) Field of Classification Search
CPC ................................. G01H 3/08; G01H 17/00
See application file for complete search history.

(56) References Cited

U.S. PATENT DOCUMENTS

| | | | |
|---|---|---|---|
| 5,805,457 A * | 9/1998 | Sanders | G10K 15/02 |
| | | | 702/56 |
| 2003/0167140 A1* | 9/2003 | Ramillon | G01H 3/08 |
| | | | 702/76 |

FOREIGN PATENT DOCUMENTS

| | | | |
|---|---|---|---|
| CN | 100561162 C | 11/2009 | |
| CN | 202209988 U | 5/2012 | |
| CN | 110568792 A * | 12/2019 | |
| DE | 3644858 A1 * | 12/2013 | G01H 3/08 |

OTHER PUBLICATIONS

He Yulong et al., "Measurements and Analyses of Indoor Ground-borne Noise Induced by Chengdu Metro", Noise and Vibration Control, vol. 40 No. 2, Apr. 2020, pp. P.202-P.206, China. (http://www.cnki.net), Apr. 2020.

* cited by examiner

*Primary Examiner* — Daniel J Colilla

(57) ABSTRACT

A vibration sensor senses vibrations generated by an object to generate a noise signal. A processor obtains a structure vibration level spectrum from the noise signal, uses equalization parameters and A-weighting parameters to adjust the structure vibration level spectrum to generate a sound pressure level spectrum, and uses the sound pressure level spectrum to calculate a noise value of the object.

7 Claims, 6 Drawing Sheets

ACOUSTIC NOISE DETECTION METHOD AND SYSTEM USING VIBRATION SENSOR TO DETECT ACOUSTIC NOISE

CROSS REFERENCE TO RELATED APPLICATION

This application claims priority to China Patent Application No. 202011300024.0, filed Nov. 19, 2020, and incorporated herein by reference in its entirety.

BACKGROUND OF THE INVENTION

1. Field of the Invention

The present invention relates to an acoustic noise detection method and system, and more particularly, an acoustic noise detection method and system using a vibration sensor to detect acoustic noise.

2. Description of the Prior Art

With the rapid development of technology, the information industry has higher and higher requirements for the quality of acoustic products. Thus, the perception of noise has begun to be valued. For general household 3C products, such as notebook computers, projectors, multi-function printers, etc., noise would be generated, which makes users feel unpleasant. Therefore, noise measurement has become an important indicator of quality verification. Currently, information products are generally required to be tested according to measurement standards such as ISO7779, ISO3744 or ISO3745.

When sound pressure level measurement and frequency analysis are performed on a product, the measured value is not expected to be affected by weather, ground or reflection of other objects, so the product would be measured in an anechoic room. Simply put, an anechoic room is a laboratory with no reflection sound field, that is, a sound field that simulates an infinite space. When measuring the sound pressure of the product, the noise outside the anechoic room can not affect the indoor measurement value. According to the International Organization for Standardization's recommendations, the volume of the object to be measured should preferably be more than 12 decibels above the background volume. Therefore, the better the sound insulation of the external wall, the more accurate the measurement value of the product. However, the anechoic room is expensive to build, and the cost of using the anechoic room to test product noise is also quite high. Therefore, there is a need for a relatively simple and accurate way to test product noise, without the need for an anechoic room environment, which can be used by engineers to measure product noise at any time in component design, production, after-sales service and other occasions.

SUMMARY OF THE INVENTION

In an embodiment, an acoustic noise detection method comprises using a vibration sensor to sense vibrations generated by an object to generate a noise signal, obtaining a structure vibration level spectrum from the noise signal, using a set of equalization parameters and a set of A-weighting parameters to adjust the structure vibration level spectrum to generate a sound pressure level spectrum, and using the sound pressure level spectrum to calculate a noise value of the object.

In another embodiment, an acoustic noise detection system comprises a vibration sensor and a processor. The vibration sensor is used to sense vibrations generated by an object to generate a noise signal. The processor is coupled to the vibration sensor for obtaining a structure vibration level spectrum from the noise signal, using a set of equalization parameters and a set of A-weighting parameters to adjust the structure vibration level spectrum to generate a sound pressure level spectrum, and using the sound pressure level spectrum to calculate a noise value of the object.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
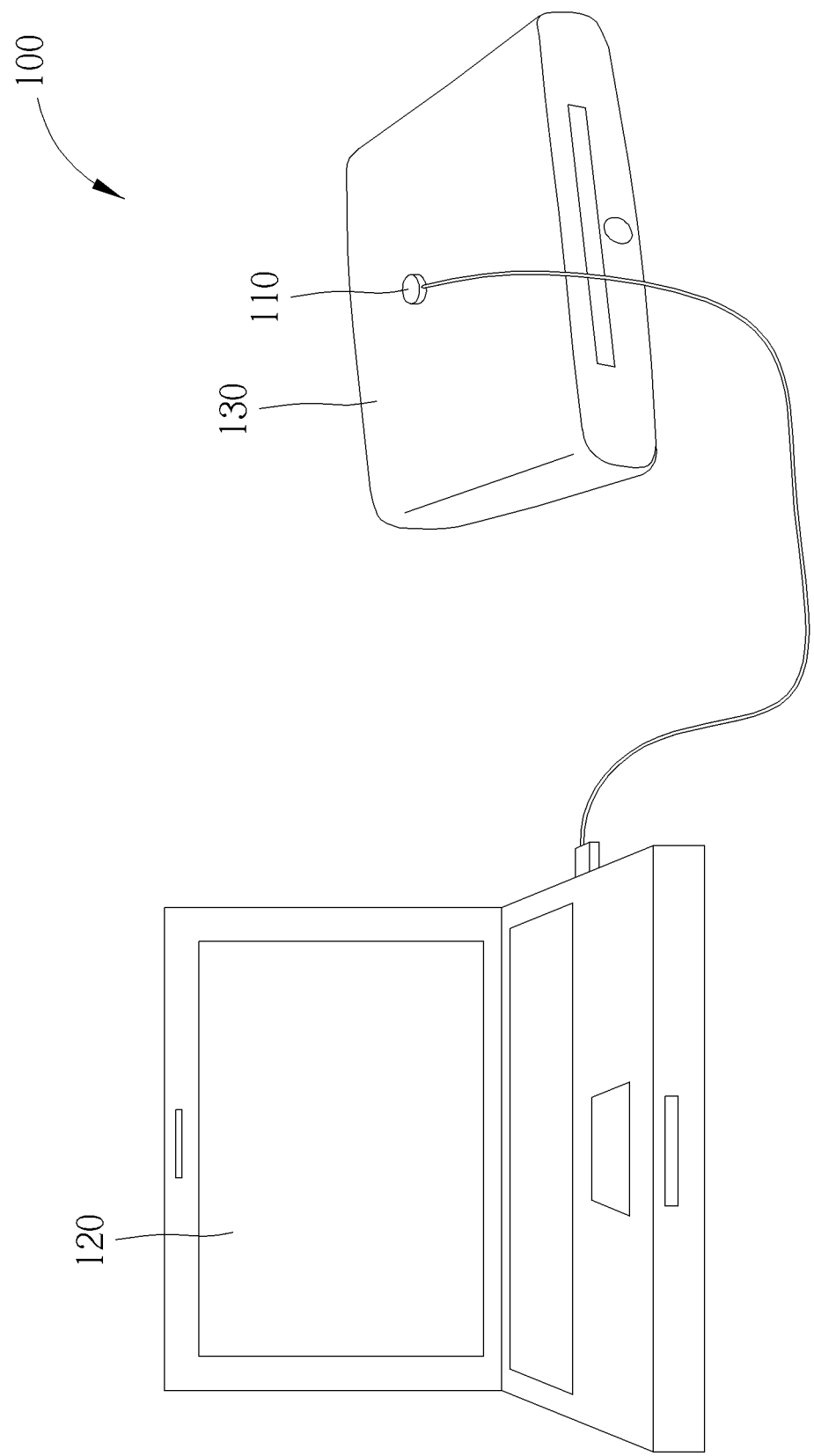
FIG. 1 is an acoustic noise detection system according to an embodiment of the invention.

FIG. 1 shows an acoustic noise detection system 100 according to an embodiment of the invention. The acoustic noise detection system 100 comprises a vibration sensor 110 and a processor 120. The vibration sensor 110 is used to sense the vibrations generated by an object 130 to generate a noise signal. The processor 120 is coupled to the vibration sensor 110 for receiving and processing the noise signal. The processor 120 generates a structure vibration level spectrum according to the noise signal, uses a set of equalization parameters and a set of A-weighting parameters to adjust the structure vibration spectrum to generate a sound pressure level spectrum, and uses the sound pressure level spectrum to calculate the noise value generated by the object 130. In this embodiment, the object 130 can be a projector or any 3C electronic device that generates vibrations. The vibration sensor 110 can be attached to the object 130 to sense the vibrations and convert them into a noise signal proportional to it. It can be an electromechanical conversion device. The vibration sensor 110 may be piezoelectric, inertial, capacitive, or inductive. The processor 120 can be any computer equipment or information device that can receive and process electronic signals.

In this embodiment, the object 130 is a projector. Since the projector comprises gears, fans, color wheels and other components that can generate vibrations, it is very suitable for detecting vibrations. However, the present invention is not limited to the projector, and those with ordinary skill in the art applying the acoustic noise detection system 100 to other hardware are within the scope of the present invention.

Figure 2:
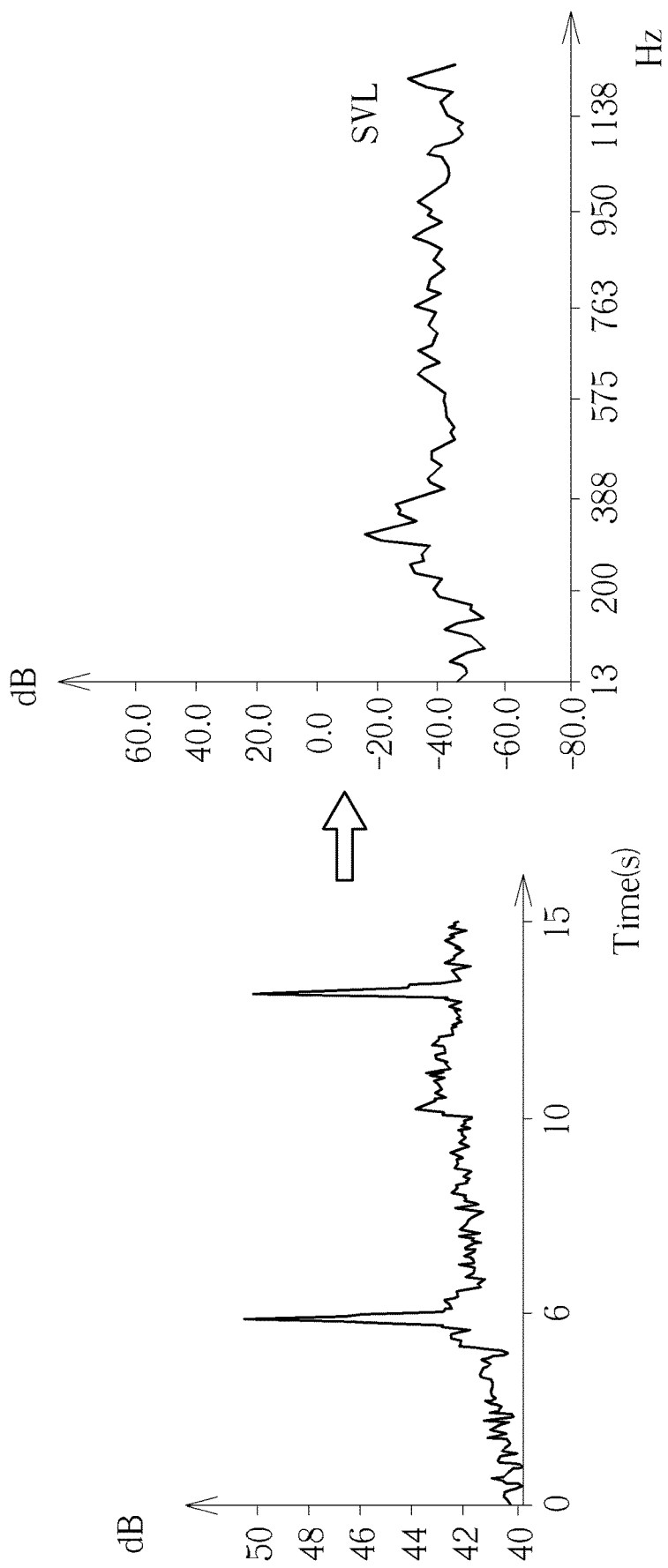
FIG. 2 is a schematic diagram of converting a noise signal into a structural vibration level spectrum according to an embodiment of the present invention.

FIG. 2 is a schematic diagram of the conversion of a noise signal into a structural vibration level spectrum SVL according to an embodiment of the present invention. The time-domain noise signal generated by the vibration sensor 110 undergoes Fast Fourier Transform (FFT) to generate the structural vibration level spectrum SVL. Fast Fourier Transformation can convert time-domain noise signals into frequency-domain noise signals. The schematic diagram contains the structural vibration level spectrum SVL from 13 Hz to 1138 Hz, but the actual frequency range can be up to 20 kHz to correspond to the frequency range of a human ear.

Figure 3:
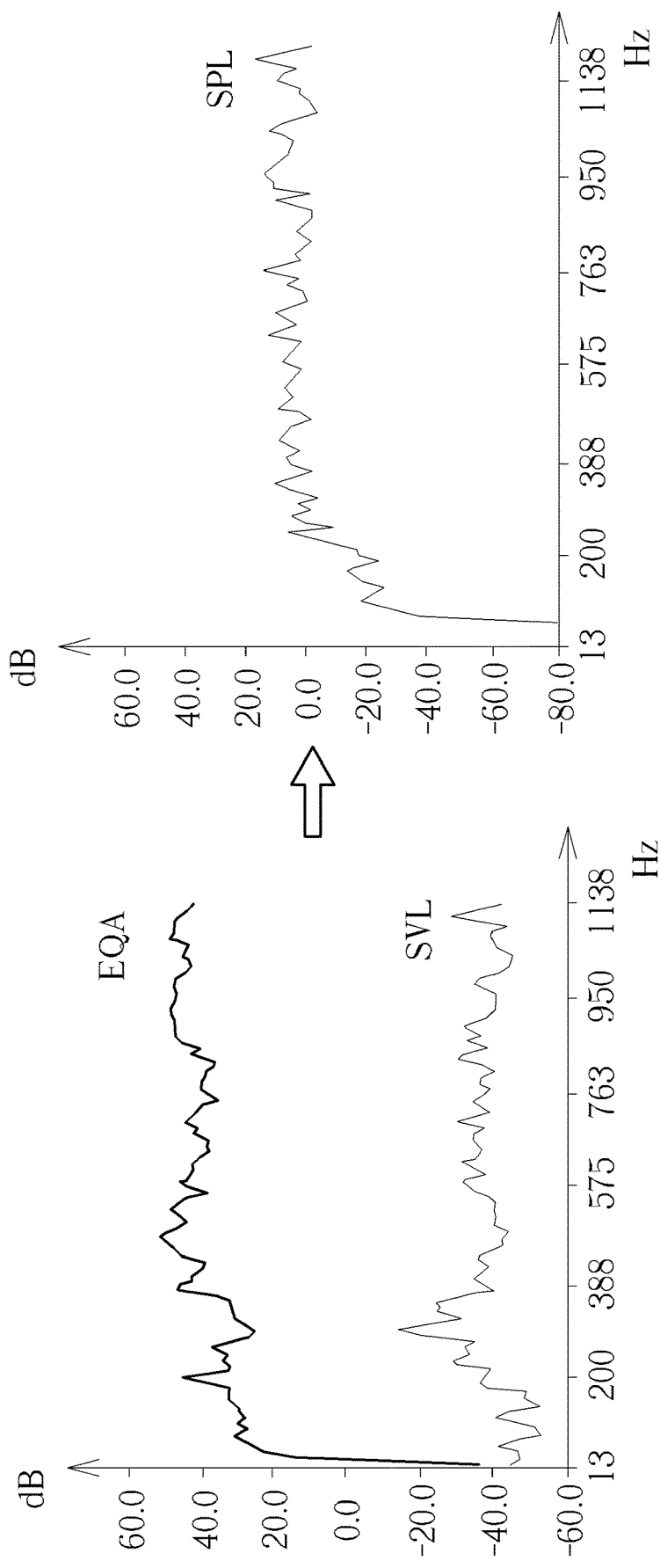
FIG. 3 is a schematic diagram of converting a structural vibration level spectrum into a sound pressure level spectrum according to an embodiment of the present invention.

FIG. 3 is a schematic diagram of the conversion of the structural vibration level spectrum SVL into a sound pressure level spectrum SPL according to the embodiment of the present invention. The structural vibration level spectrum SVL can be adjusted by the equalization parameters and A-weighting parameters to generate the sound pressure level spectrum SPL. The equation for converting the structural vibration level spectrum SVL to the sound pressure level spectrum SPL is:

$$SPL(f) = SVL(f) + EQ(f) + A\text{-weighting}(f)$$

where SPL is sound pressure level, SVL is structure vibration level, EQ is equalization parameter, A-weighting is A-weighting parameter, f is frequency, and SPL, SVL, EQ and A-weighting are functions of frequency. The A-weighting parameters are weighting parameters of sound levels corresponding to different frequencies perceived by a human hear. The equalization parameters are weighting parameters of corresponding frequencies of the structural vibration level spectrum and the sound pressure level spectrum. As shown in FIG. 3, the equalization parameters and the A-weighting parameters can be integrated into adjustment parameters EQA, namely EQA(f)=EQ(f)+A-weighting(f). The frequency range of the diagram is 13 Hz to 1138 Hz, but the actual frequency range can be up to 20 kHz.

In an embodiment, the equalization parameters can be obtained by the following steps: perform a noise test on a sample with the same hardware structure as the object 130 in an anechoic room to obtain the sound pressure levels of the sample, and use a vibration sensor to obtain structural vibration levels of the sample. The equalization parameters related to the object 130 are established from the differences of the corresponding frequencies between the structural vibration levels and the sound pressure levels. In this embodiment, MATLAB software is used to convert the differences between the structural vibration levels and the sound pressure levels at corresponding frequencies into a 1600-point spectrum difference table (Equalizer table, EQ table), so as to generate the equalization parameters EQ and store the equalization parameters EQ in the database. However, the present invention is not limited thereto. Those skilled in the art using other software and hardware to establish equalization parameters should fall within the scope of the present invention.

The structure vibration level spectrum SVL generated by the vibrations of the object 130 is adjusted by the equalization parameters and the A-weighting parameters to generate the sound pressure level spectrum SPL. The sound pressure level spectrum SPL can simulate the noise test result in an anechoic room. Finally, the noise value generated by the operation of the object 130 is a decibel value of a sum of sound pressure levels of all frequencies in the sound pressure level spectrum SPL. Exemplary experimental values are listed in Table 1. Due to space, only the values in the frequency range of 13 Hz to 20 kHz are listed in Table 1. The sound pressure levels are the largest between the frequency of about 400 Hz and 2000 Hz, so the sum of sound pressure levels in this interval has the highest proportion. In this embodiment, the decibel value of the sum of the sound pressure levels is 32.55 dB, which is the noise value of the object 130.

TABLE 1

| Frequency (Hz) | EQA (dB) | EQ (dB) | A-weighting (dB) | SVL (dB) | SPL (dB) |
|---|---|---|---|---|---|
| 13 | −35.3 | 28.3 | −63.6 | −43.8 | −79.1 |
| 113 | 29.3 | 46.9 | −17.5 | −39.9 | −10.6 |
| 400 | 46.5 | 51.3 | −4.8 | −35.1 | 11.4 |
| 588 | 45.4 | 47.7 | −2.3 | −38.6 | 6.9 |
| 775 | 42.8 | 43.8 | −0.9 | −38.2 | 4.7 |
| 875 | 37.5 | 38.0 | −0.4 | −36.4 | 1.1 |
| 1138 | 44.7 | 44.3 | 0.4 | −40.0 | 4.7 |
| 1475 | 47.7 | 46.8 | 0.9 | −33.8 | 13.9 |
| 1575 | 45.9 | 45.0 | 1.0 | −35.6 | 10.3 |
| 1925 | 44.7 | 43.5 | 1.2 | −21.2 | 23.5 |
| 3700 | 46.6 | 45.5 | 1.1 | −56.0 | −9.4 |
| 4313 | 47.3 | 46.5 | 0.8 | −58.5 | −11.1 |
| 5225 | 44.9 | 44.5 | 0.4 | −56.6 | −11.7 |
| 10050 | 36.7 | 39.2 | −2.5 | −56.7 | −20.0 |
| 12863 | 33.3 | 37.8 | −4.5 | −58.2 | −24.8 |
| 14713 | 29.7 | 35.5 | −5.8 | −58.9 | −29.2 |
| 17788 | 24.7 | 32.6 | −7.9 | −62.6 | −38.0 |
| 20000 | 23.6 | 32.9 | −9.3 | −65.8 | −42.2 |

Figure 4A:
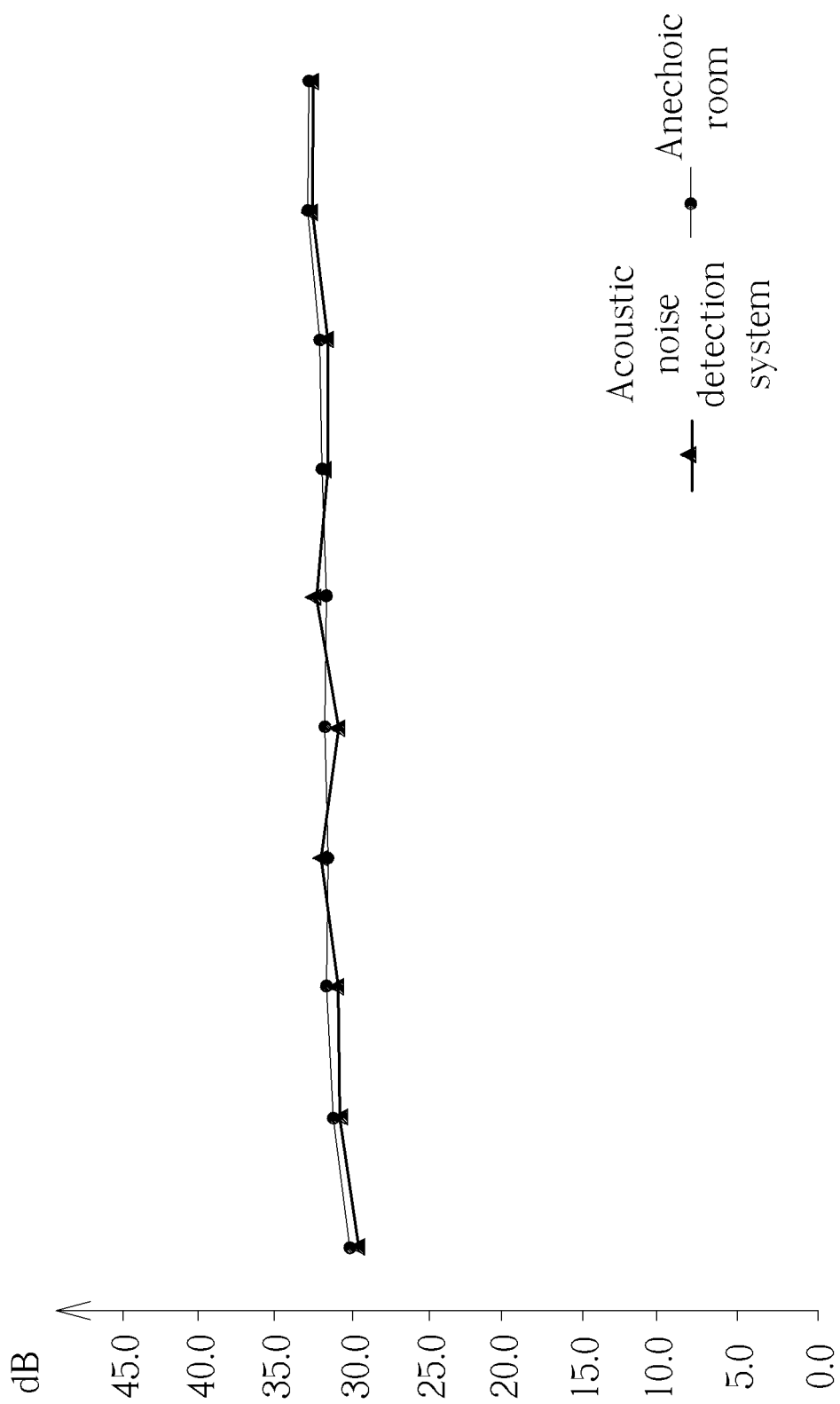
FIG. 4A is a schematic diagram of comparison of experimental data between the acoustic noise detection system in FIG. 1 and an anechoic room.
Figure 4B:
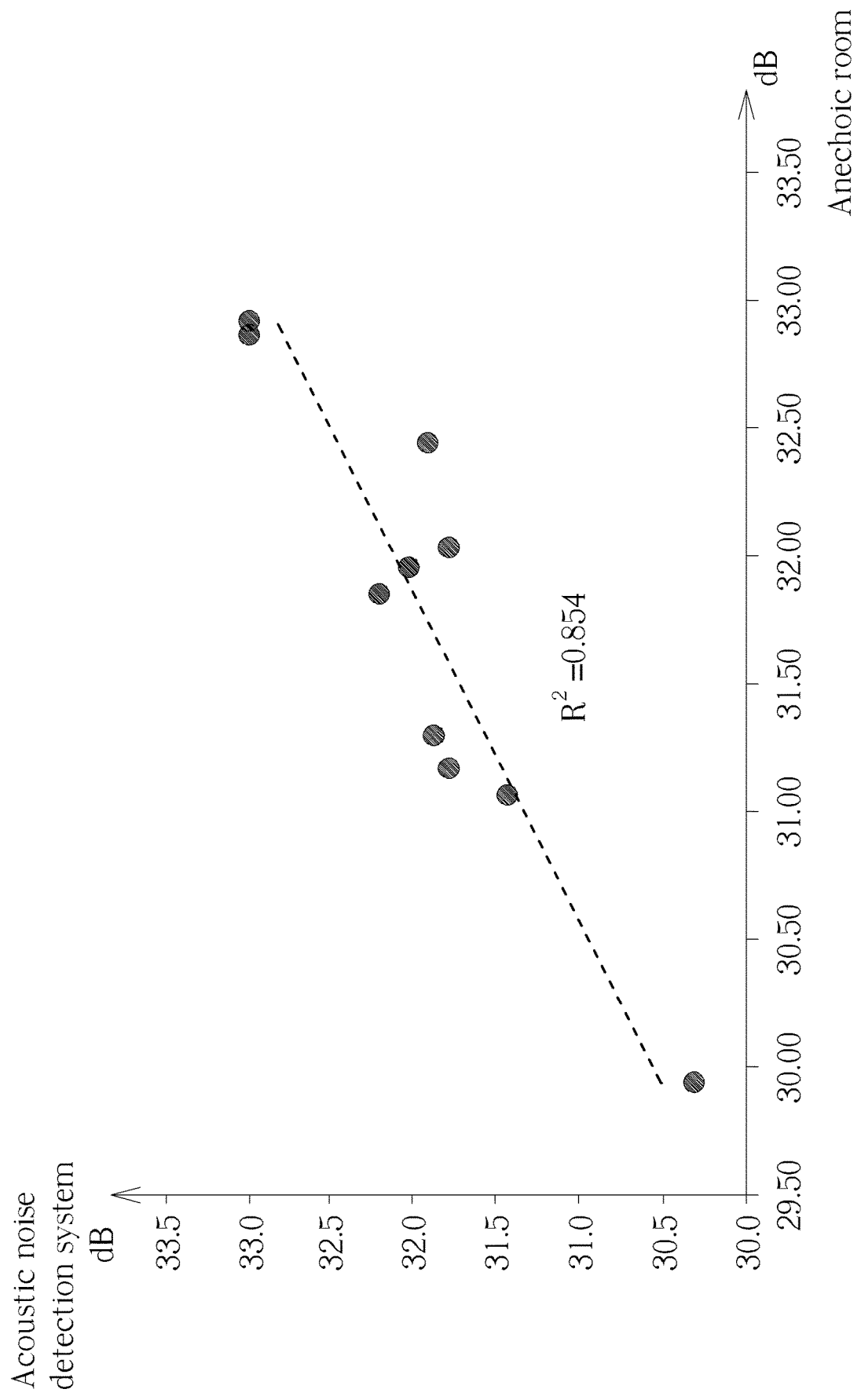
FIG. 4B is a diagram of the relationship between the noise detection results of the acoustic noise detection system in FIG. 1 and an anechoic room.

FIG. 4A is a schematic diagram of comparison of experimental data between the acoustic noise detection system 100 and the anechoic room according to the embodiment of the present invention. It can be seen from FIG. 4A that the noise value of the object 130 measured by the acoustic noise detection system 100 is quite close to the noise value of the object 130 measured in the anechoic room. The average error between the two is about 0.33 dB. FIG. 4B is a diagram of the relationship between the noise detection results of the acoustic noise detection system 100 and the anechoic room. The vertical axis is the noise value of the object 130 measured by the acoustic noise detection system 100, and the horizontal axis is the noise value of the object 130 measured in the anechoic room. The relationship between the two can be represented by the Pearson product-moment correlation coefficient in statistics. After calculation, the Pearson product-moment correlation coefficient R2=0.854 of the two indicates that the noise value of the object 130 measured by the acoustic noise detection system 100 is quite close to the noise value of the object 130 measured in the anechoic room. Therefore, the acoustic noise detection system 100 of the present invention can, to a certain extent, replace the undisturbed anechoic room to detect acoustic noise to lower the cost.

Figure 5:
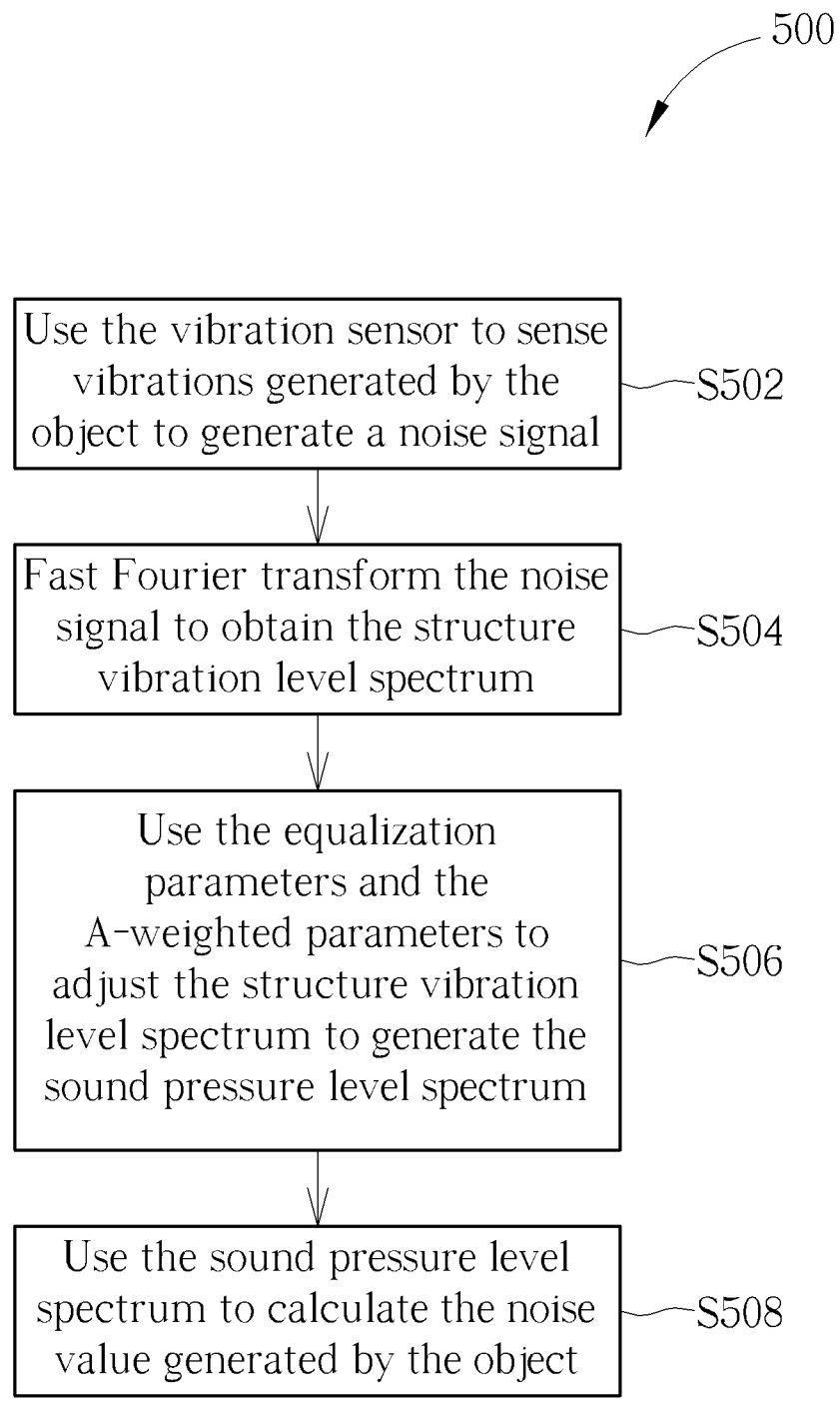
FIG. 5 is a flowchart of an acoustic noise detection method using an acoustic noise detection system in FIG. 1.

FIG. 5 is a flowchart of an acoustic noise detection method 500 using the acoustic noise detection system 100 according to an embodiment of the present invention. The acoustic noise detection method 500 comprises the following steps:

S502: Use the vibration sensor 100 to sense vibrations generated by the object 130 to generate a noise signal;

S504: Fast Fourier transform the noise signal to obtain the structure vibration level spectrum SVL;

S506: Use a set of equalization parameters and a set of A-weighted parameters to adjust the structure vibration level spectrum SVL to generate the sound pressure level spectrum SPL; and S508: Use the sound pressure level spectrum SPL to calculate the noise value generated by the object 130.

The equation for converting the structural vibration level spectrum SVL to the sound pressure level spectrum SPL is:

$$SPL(f)=SVL(f)+EQ(f)+A\text{-weighting}(f)$$

where SPL is sound pressure level, SVL is structure vibration level, EQ is equalization parameter, A-weighting is A-weighting parameter, f is frequency, and SPL, SVL, EQ and A-weighting are functions of frequency. The A-weighting parameters are weighting parameters of sound levels corresponding to different frequencies perceived by a human hear. The equalization parameters are weighting parameters of corresponding frequencies of the structural vibration level spectrum and the sound pressure level spectrum.

In summary, the acoustic noise detection system and method of the present invention can replace the function of the anechoic room to a certain extent, and detect product noise in a convenient and low-cost manner. By using the sample of the product to detect and establish equalization parameters in the anechoic room, the system and method can detect the noise value of objects with the same hardware structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An acoustic noise detection method comprising:
   performing a noise test on a sample in an anechoic room to obtain a set of sound pressure levels of the sample;
   using a vibration sensor to obtain a set of structural vibration levels of the sample;
   establishing a set of equalization parameters from differences of corresponding frequencies between the set of structural vibration levels and the set of sound pressure levels;
   using another vibration sensor to sense vibrations generated by an object to generate a noise signal, wherein the sample and the object have identical hardware structure;
   obtaining a structure vibration level spectrum from the noise signal;
   using the set of equalization parameters and a set of A-weighting parameters to adjust the structure vibration level spectrum to generate a sound pressure level spectrum; and
   using the sound pressure level spectrum to calculate a noise value of the object.

2. The acoustic noise detection method of claim 1 wherein using the set of equalization parameters and the set of A-weighting parameters to adjust the structure vibration level spectrum to generate the sound pressure level spectrum is:

$$SPL(f)=SVL(f)+EQ(f)+A\text{-weighting}(f)$$

wherein SPL is sound pressure level, SVL is structure vibration level, EQ is equalization parameter, A-weighting is A-weighting parameter, f is frequency, and SPL, SVL, EQ and A-weighting are functions of frequency.

3. The acoustic noise detection method of claim 1 wherein obtaining the structure vibration level spectrum from the noise signal is performed by Fast Fourier Transform.

4. The acoustic noise detection method of claim 1 wherein the set of A-weighting parameters is weighting parameters of sound levels corresponding to different frequencies perceived by a human hear.

5. The acoustic noise detection method of claim 1 wherein the set of equalization parameters is weighting parameters of corresponding frequencies of the structural vibration level spectrum and the sound pressure level spectrum.

6. The acoustic noise detection method of claim 1 wherein the noise value is a decibel value of a sum of sound pressure levels of all frequencies in the sound pressure level spectrum.

7. The acoustic noise detection method of claim 1 wherein the object is a projector.

* * * * *